Figure 1:
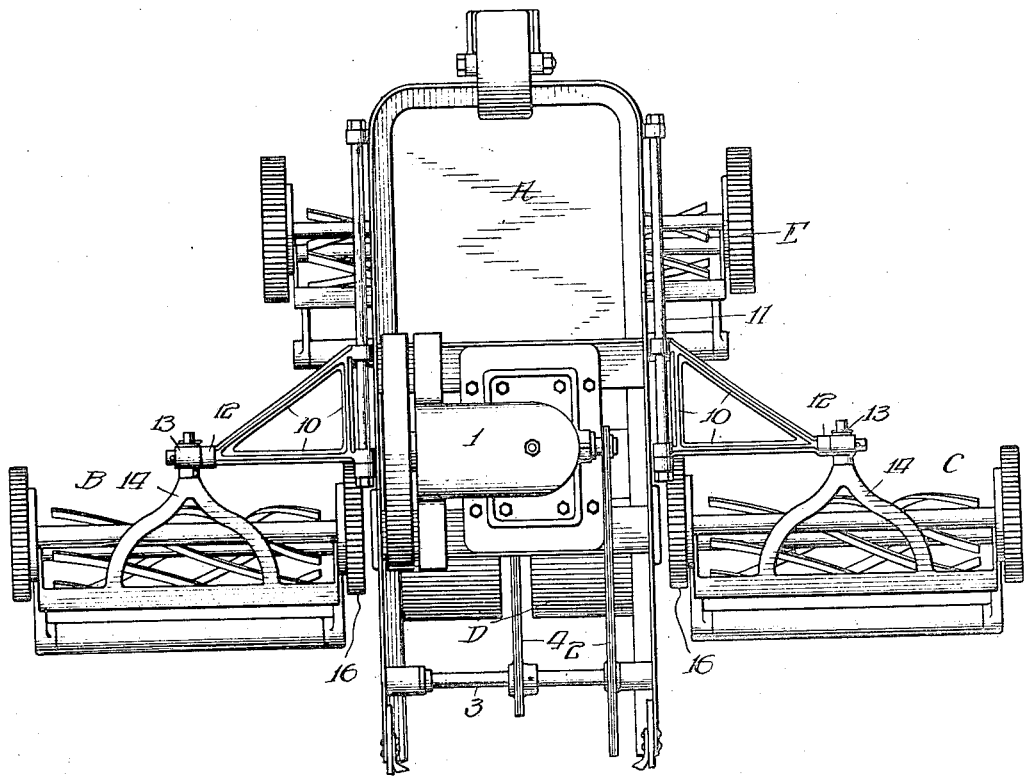

Feb. 6, 1923.

M. H. REED.
LAWN MOWER.
FILED MAR. 27, 1920.

1,444,387.

2 SHEETS—SHEET 1.

Witness:
R. Burkhardt

Inventor:
Matthew Howard Reed
By Wilkinson Huxley Byron & Knight
Attys.

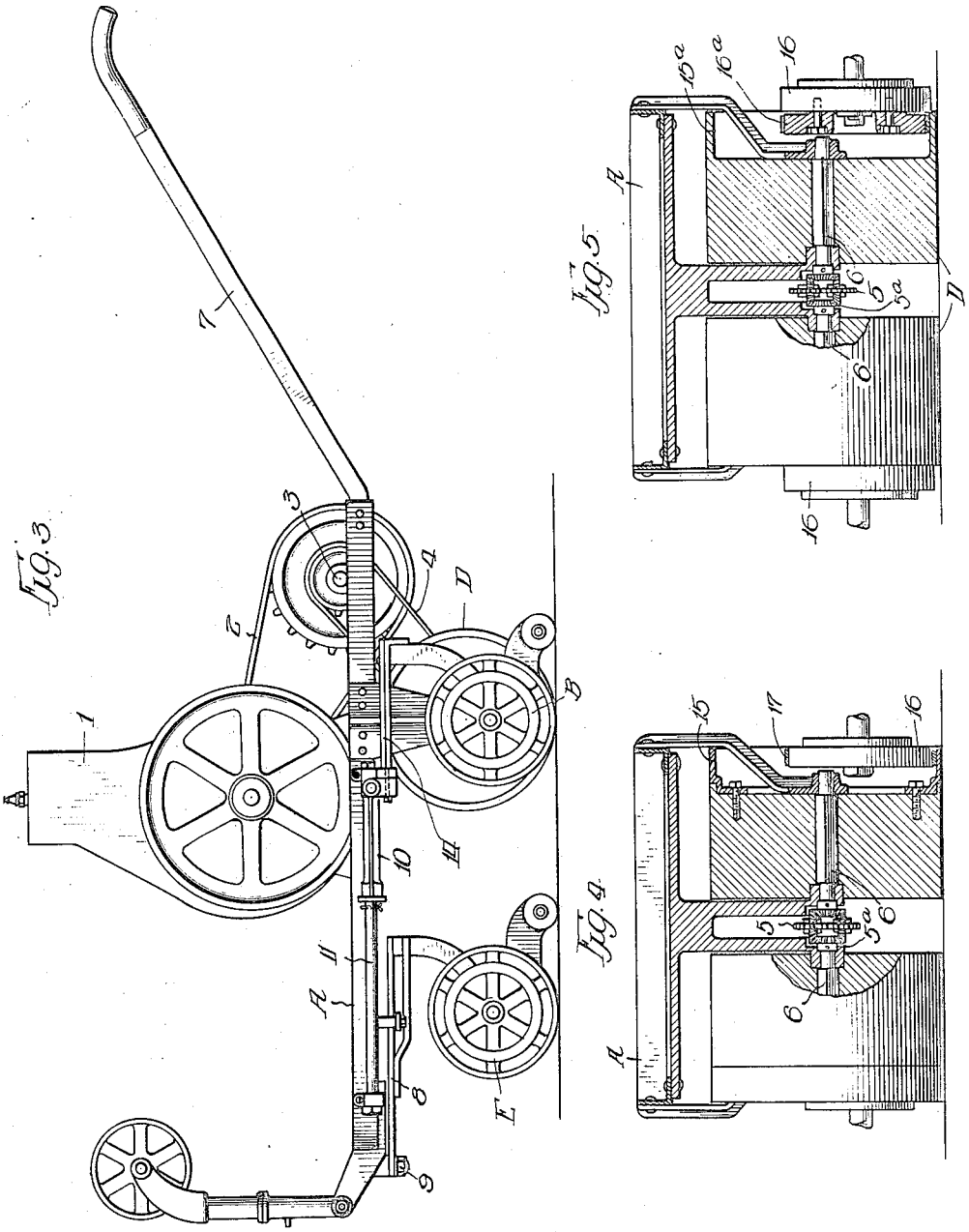

Patented Feb. 6, 1923.

1,444,387

UNITED STATES PATENT OFFICE.

MATTHEW HOWARD REED, OF CHICAGO, ILLINOIS.

LAWN MOWER.

Application filed March 27, 1920. Serial No. 369,234.

*To all whom it may concern:*

Be it known that I, MATTHEW HOWARD REED, a citizen of the United States, residing at Chicago, in the county of Cook and State of Illinois, have invented certain new and useful Improvements in Lawn Mowers, of which the following is a specification.

This invention relates to a mowing machine of the type which has a main rotary ground support upon which the machine travels and which is generally provided with a propelling motor, and the invention has for its object to increase the lateral dimension of the path cut by the machine by mounting an additional mower or mowers on the machine in positions offset laterally therefrom.

The invention proceeds upon the principle that if a main centrally disposed driving support be made to carry the load of the machine independently of the cutting elements and if the laterally offset mower or mowers be located with the axes of their cutter driving wheels in the same vertical transverse plane with the axis of the main driving support and rigged to the body of the machine through connections that leave them free to swing vertically and subjected merely to the load of their own weights, properly regulated to insure drive of their cutters, the main ground support can not only be made of such form that will save the lawn from injury when in soft condition and prevent cutting the turf by the narrow driving wheels of the cutting units, but the manipulation or control of the machine will be greatly facilitated, the mower or mowers may be united with the machine by draft connections which are rigid in a horizontal plane, and the machine will execute its turning movements, in changing direction of travel, about the vertical axis of the main ground support while the mower on either side thereof will merely roll rearwardly or forwardly according to the direction of turning without material side thrust or lateral drag that would do violence to their draft connections or cut up the turf, and these conditions will be realized to an especially advantageous degree if the central driving support be subdivided into two units having differential driving connection with the power unit.

While the primary features of the invention may be realized independently of a mower located in longitudinal alinement with a ground support, such longitudinally alined mower will ordinarily be employed and will be of such dimension laterally of the machine as to cause its path to merge with or overlap the path of the laterally disposed mower or mowers.

The invention consists in the features of novelty above outlined, as well as in certain features of novel construction whereby the basic ideas of the invention may be successfully realized.

An illustrative embodiment of the several features of the invention is shown in the accompanying drawings, in which—

Figure 2:
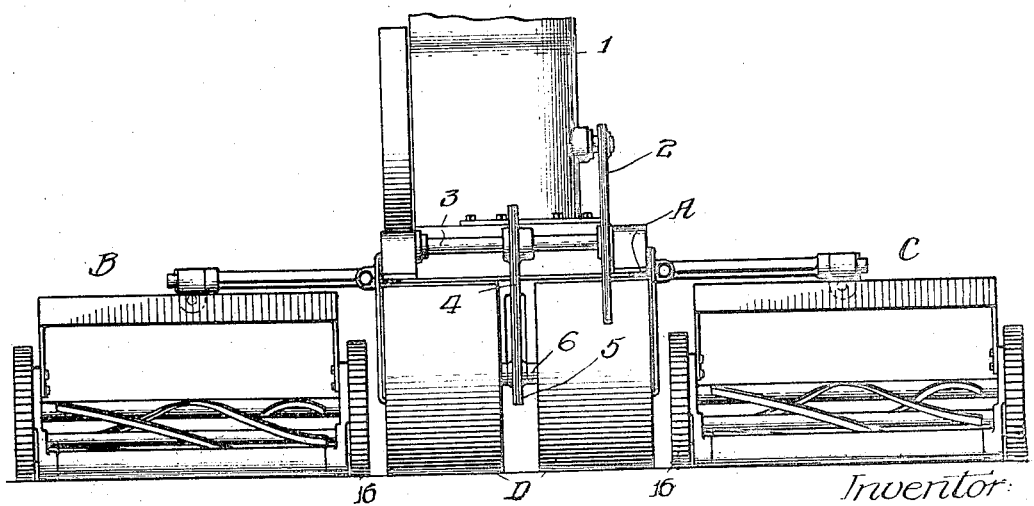

Figure 1 is a top plan view of the machine.
Figure 2 is a rear elevation of the same.
Figure 3 is a side elevation; and
Figures 4 and 5 are detail axial sections of the main rotary ground support showing modifications in the relation thereto of the inner wheels of the laterally disposed mowers.

A represents the body of the mowing machine which in general construction may correspond substantially to that disclosed in my United States Letters Patent No. 1,304,372, issued May 20, 1919. According to the present invention, this mowing machine is provided with laterally offset mowers B and C. It is also provided with a main rotary ground support D, and will preferably carry the forward mower E in longitudinal alinement with said ground support and mounted on the machine in the manner described and claimed in my aforesaid patent.

The mowing machine A is preferably provided with some suitable form of motor 1 which is adapted to propel the machine through connections such as belt 2, shaft 3, belt 4, and sprocket 5 on the axle 6 of the ground support D. In the type of mowing machine illustrated, the direction of travel is controlled by a handle 7 projecting rearwardly from the machine in a manner to permit the machine to be swung horizontally upon its main support D, and to facilitate this manipulation the longitudinally alined mower E is associated with the machine through the medium of a draft connection 8 freely swinging from the pivot bolt 9, as described in my aforesaid patent.

The additional mowers B and C, with which the machine is provided in accordance with the present invention, are offset laterally from the machine in substantial alinement with the axis of the ground support D, and they are associated with the machine through means of horizontally rigid offset brackets 10. In order that the mowers B and C may conform closely to the surface over which they travel, brackets 10 have free vertical hinging movement on hinge bars 11 longitudinally disposed along the sides of the machine, and connect with the mowers at their outer ends through the medium of vertically swinging sleeves 12 and torsionally flexible connections 13. By this organization of draft transmission, the laterally disposed mowers have perfect freedom of rising and falling with unevenness in the surface or changing their angle about the longitudinally extending horizontal axis of swivel connections 13 as may be required.

With the arrangement of the mowers as above described, the machine is rendered easy of manipulation, since lateral pressure upon the grips of handles 7 tends to turn the machine about a vertical axis intersecting the horizontal axle 6 of the main ground support, and in this movement the front or longitudinally alined mower E will assume a freely trailing relation to the front of the machine, while one of the mowers B and C will be accelerated or retarded relatively to the other according to the direction of turning. The differential $5^a$ between sprocket 5 and axle 6 (Figure 4) permits the drive of the motor to continue during the turning operation without imposing undue labor in steering.

While ordinarily the inner wheels 16 will run directly upon the ground, in some instances it may be desirable to support the inner ends of the laterally disposed mowers upon the rotary ground support D. This may be effected by providing the individual rollers of said ground support with end flanges 15 receiving the ground wheels 16 at the inner ends of said laterally disposed mowers, which, however, when the flanges 15 are removed, will run directly upon the ground.

To facilitate the drive necessary to revolve the mower, wheels 16 may be provided with rubber or other tires 17; or rollers D of the ground support may carry permanently attached flanges $15^a$ as shown in Figure 5, and the wheels 16 may be fitted with axial extensions $16^a$ removably bolted to the wheels so as to bring the support of the inner end of the mower upon the flange when desired.

The cutting reel of the side mowers can be driven entirely from the rotary ground support of the machine, or from such rotary support together with their own outer ground wheels.

I claim:

1. In a power driven mowing machine, a body, mowing mechanism connected with and laterally offset from said body, means projecting from said body through which to swing the machine about a vertical axis, and thereby direct its course, a pair of independently rotatable traction and supporting means located on opposite sides of said vertical axis and partaking of the swinging directing movements of the machine, and a power plant mounted on said body and having differential driving connection with said ground supports.

2. In a power driven mowing machine, a body, means projecting from said body through which to swing the machine about a vertical axis and thereby direct its course, a pair of independently rotatable traction supports located on opposite sides of said vertical axis and partaking of the swinging directing movements of the machine, a power plant mounted on said body and having differential driving connection with said traction supports, and mowing mechanism having draft connection with said body, provided with supporting and driving wheels, and laterally offset with respect to said body.

3. A mowing machine having a body, a centrally disposed main traction support upon which said body is mounted, comprising two units adapted to rotate differentially, a motor having driving connection with the respective units of said support, a pair of mowers offset laterally from the body of the machine, with ground wheels for actuating them located with their axes in substantially the same transverse plane with the axes of the main ground support, and draft connections between said mowers and the body which are vertically yielding but horizontally non-yielding.

4. In a power driven mowing machine, a body, a pair of main ground supports upon which said body travels, a power plant mounted on said body and having differential driving connection with said respective ground supports, and a mower offset laterally from said main ground supports and having vertically yielding but horizontally rigid draft connection with the body.

5. In a power driven mowing machine, a body, a pair of main ground supports upon which said body travels, a power plant mounted on said body and having differential driving connection with said respective ground supports, and a pair of mowers offset laterally from said main ground supports and having vertically yielding but horizontally rigid draft connection with the body.

6. In a mowing machine having a body portion and a main ground support, a laterally offset mower adapted to support itself upon the ground and a vertically yielding but horizontally rigid draft connection between said mower and said body portion comprising a longitudinally extending hinge bar carried by the body portion, and a bracket arm adapted to swing vertically upon said hinge bar and extending laterally therefrom to the point of connection with the mower.

7. A mowing machine having a rotary ground support on which it travels, and a mower having draft connection with the mowing machine and offset laterally therefrom; said draft connection comprising a hinge bar longitudinally mounted upon the machine, and a bracket arm swinging upon said hinge bar and extending outwardly to the mower; said bracket arm being adapted to slide longitudinally upon said hinge bar to permit shifting of the mower longitudinally of the machine.

8. In combination with a moving machine, a longitudinally disposed hinge bar, a bracket swinging vertically on said hinge bar, a sleeve on the outer end of said bracket affording a vertically flexible connection with the bracket, a swivel carried by said sleeve and having its axis of movement disposed longitudinally of the machine, and a mower connected with said swivel.

9. A mowing machine having a main ground support upon which it travels, a mower alined with said ground support longitudinally of the machine, having a cutter extending transversely of the machine a distance at least equal to the axial dimension of said ground support, and a mower disposed laterally to said ground support having a cutter proportioned and positioned to cut a path that merges with that of the longitudinally alined mower; the longitudinally alined mower having a laterally yielding draft connection with the machine; and the laterally disposed mower having draft connection which is horizontally rigid but vertically yielding.

10. A mowing machine having a main ground support upon which it travels, a mower alined with said ground support longitudinally of the machine, having a cutter extending transversely of the machine a distance greater than the axial dimension of the ground support and projecting beyond the ends of said support, and a mower disposed laterally to said ground support having a cutter dimensioned and positioned to cut a path that merges with that of the longitudinally alined mower; the longitudinally alined mower having a freely trailing draft connection with the machine which affords lateral yielding of said mower; and the laterally disposed mower having draft connection with the machine which resists both longitudinal and lateral yielding relatively to the machine.

11. A mowing machine having a main ground support upon which it travels, and a mower having draft connection with the mowing machine and offset laterally therefrom in substantial alinement with the axis of said ground support; said mower having its inner end carried by said ground support.

12. A mowing machine having a main ground support upon which it travels, a mower having draft connection with the mowing machine and offset laterally therefrom in substantial alinement with the axis of said ground support, and means carried by said ground support for sustaining the inner end of said mower.

13. A mowing machine having a main ground support upon which it travels, and a mower having draft connection with the mowing machine and offset laterally therefrom in substantial alinement with the axis of said ground support; said mower having wheels upon which it runs; and said ground support having a flange receiving one of said wheels.

14. A mowing machine having a main ground support upon which it travels, and a mower having draft connection with the mowing machine and offset laterally therefrom in substantial alinement with the axis of said ground support; said mower having wheels upon which it runs, with one wheel adjacent said ground support; and said ground support having a removable flange attachable thereto in position to receive said adjacent wheel.

15. A mowing machine having a main ground support upon which it travels, and a mower having draft connection with the mowing machine and offset laterally therefrom in substantial alinement with the axis of said ground support; said mower having wheels upon which it runs, with one wheel adjacent the outer end of the ground support, and means whereby the adjacent wheel and ground support are brought into bearing, one upon the other, at will, comprising a removable extension on the one thereof overlapping and entering into bearing with the other thereof.

16. In a mowing machine, a main ground support upon which the machine travels, a power unit driving said support to propel the machine, laterally disposed cutting units in substantial alinement with the axis of the power driven ground support, having horizontally rigid draft connection with the machine; said ground support being subdivided into two units and having differential drive connection with the power unit, and a cutting unit disposed in longitudinal alinement with the ground support and cutting a path which overlaps the paths of the two laterally disposed cutting units.

17. In a mowing machine, a main ground support upon which the machine travels, a power unit driving said support to propel the machine, laterally disposed cutting units in substantial alinement with the axis of the power driven ground support, having horizontally rigid draft connection with the machine, said ground support being subdivided into two units and having differential drive connection with the power unit, and a cutting unit disposed in longitudinal alinement with the ground support and cutting a path which overlaps the paths of the two laterally disposed cutting units; said longitudinally alined cutting unit having freely trailing draft connection with the machine.

18. A mowing machine having a main ground support upon which it travels, and a mower having draft connection with the mowing machine and offset laterally from said ground support; said mower having a cutter drive-imparting wheel driven by said ground support.

19. In a mowing machine, a ground support upon which the machine travels, a power unit driving said support to propel the machine, a laterally disposed cutting unit in substantial alinement with the axis of the power driven ground support driving wheels for said cutting unit, and means transmitting cutting drive from the power unit to said drive wheels.

20. In a mowing machine, a ground support upon which the machine travels, a power unit driving said support to propel the machine, and a laterally disposed cutting unit in substantial alinement with the axis of the power driven ground support; said cutting unit receiving its cutting drive in part from the power unit and in part from its traverse of the ground.

21. A mowing machine having a main ground support upon which it travels, a mower alined with said ground support longitudinally of the machine cutting a path at least equal to the axial dimension of said ground support, a mower disposed laterally to said ground support cutting a path that merges with that of the longitudinally alined mower, and means for transmitting cutting drive from the power unit to a part only of said cutting units.

Signed at Chicago, Illinois, this 24th day of March, 1920.

MATTHEW HOWARD REED.